(12) United States Patent
Jaena et al.

(10) Patent No.: US 9,698,548 B2
(45) Date of Patent: Jul. 4, 2017

(54) ELECTRICAL BUSWAY SPLICE CONNECTOR

(71) Applicant: Power Distribution, Inc., Richmond, VA (US)

(72) Inventors: Mario L. Jaena, Kent, WA (US); Vladimir Gulkarov, San Diego, CA (US); Isaac Folk, Glen Allen, VA (US)

(73) Assignee: Power Distribution, Inc., Richmond, VA (US)

( * ) Notice: Subject to any disclaimer, the term of this patent is extended or adjusted under 35 U.S.C. 154(b) by 0 days.

(21) Appl. No.: 14/928,795

(22) Filed: Oct. 30, 2015

(65) Prior Publication Data

US 2016/0049759 A1 Feb. 18, 2016

Related U.S. Application Data

(63) Continuation of application No. 14/448,043, filed on Jul. 31, 2014, now Pat. No. 9,190,791.

(51) Int. Cl.
*H01R 25/16* (2006.01)
*H01R 25/14* (2006.01)
*H01R 13/187* (2006.01)

(52) U.S. Cl.
CPC ......... *H01R 25/162* (2013.01); *H01R 25/145* (2013.01); *H01R 13/187* (2013.01)

(58) Field of Classification Search
CPC .. H01R 9/2675; H01R 9/2658; H01R 25/162; H01R 25/145; H01R 13/187
USPC ....... 439/110, 719, 121, 213, 507, 509, 113; 174/72 B, 88 B
See application file for complete search history.

(56) References Cited

U.S. PATENT DOCUMENTS

| | | | |
|---|---|---|---|
| 3,181,102 A | 4/1965 | Fehr, Jr. | |
| 3,189,679 A | 6/1965 | Scofield | |
| 3,475,567 A | 10/1969 | Hollander | |
| 4,179,174 A | 12/1979 | Jorgensen | |
| 4,462,657 A | 7/1984 | Snowdon | |
| 5,336,097 A | 8/1994 | Williamson, Jr. et al. | |
| 5,449,056 A | 9/1995 | Ross | |
| 5,588,884 A * | 12/1996 | Rudoy | H01R 31/02 439/787 |
| 5,609,254 A | 3/1997 | Loftus et al. | |
| 5,760,339 A | 6/1998 | Faulkner et al. | |

(Continued)

FOREIGN PATENT DOCUMENTS

JP    2001-266972    9/2001

*Primary Examiner* — Harshad Patel
(74) *Attorney, Agent, or Firm* — Snell & Wilmer LLP (57) ABSTRACT

A splice connector for a busway system utilizes individual connectors made of a conductive material and having a u-shaped cross-section that fit over ends of a pair of busbars to be connected to each other, and within which are mounted multi-contact louvers that extend the length of the connectors to establish a low impedance electrical connection between the connector and the respective busbars. The louvers are secured in place by a dovetail groove that retains the louvers within the connectors and causes the individual contact sections of the louvers to bow outwardly so as to press against the busbars when the connector is fitted over the busbars. The connectors are snapped into insulative housing halves or sections that align the connectors with the busbars, and that provide isolation between horizontally aligned pairs of connectors.

20 Claims, 4 Drawing Sheets

(56) References Cited

U.S. PATENT DOCUMENTS

| | | | |
|---|---|---|---|
| 5,854,445 A | 12/1998 | Graham et al. | |
| 6,039,584 A | 3/2000 | Ross | |
| 6,089,929 A * | 7/2000 | Sloey | H01R 13/187 439/845 |
| 6,105,741 A | 8/2000 | Ross | |
| 6,176,711 B1 * | 1/2001 | Rohr | H01R 25/145 174/98 |
| 6,296,498 B1 | 10/2001 | Ross | |
| 6,517,363 B2 | 2/2003 | Ross | |
| 6,521,837 B2 * | 2/2003 | Hilgert | H02G 3/0608 174/149 B |
| 6,803,523 B2 * | 10/2004 | Yuasa | H01R 13/17 174/88 B |
| 6,805,226 B1 | 10/2004 | Ross et al. | |
| 6,870,103 B1 | 3/2005 | Wiant et al. | |
| 6,983,742 B2 | 1/2006 | Jordan et al. | |
| 7,014,516 B2 | 3/2006 | Yang | |
| 7,134,903 B1 | 11/2006 | Pavlovic | |
| 7,374,444 B1 | 5/2008 | Bennett | |
| 7,468,488 B1 | 12/2008 | Hilgert | |
| 7,470,861 B1 | 12/2008 | Ross et al. | |
| 7,678,995 B2 | 3/2010 | Hengel | |
| 7,819,676 B1 | 10/2010 | Cardoso et al. | |
| 7,980,872 B1 | 7/2011 | Smutny et al. | |
| 2007/0066152 A1 * | 3/2007 | Mohs | H01R 13/113 439/843 |
| 2008/0302553 A1 | 12/2008 | Ross et al. | |
| 2010/0029129 A1 | 2/2010 | Cox et al. | |
| 2012/0264317 A1 | 10/2012 | Balcerak | |
| 2013/0052850 A1 | 2/2013 | Osterhart et al. | |
| 2013/0171849 A1 | 7/2013 | Mooney et al. | |

* cited by examiner

ELECTRICAL BUSWAY SPLICE CONNECTOR

CROSS REFERENCE TO RELATED APPLICATION

This application is a continuation of U.S. patent application Ser. No. 14/448,043 entitled Electrical Busway Splice Connector, filed on Jul. 31, 2014, which is hereby incorporated by reference herein in its entirety.

BACKGROUND

1. Field of the Invention

The invention relates to a splice connector for joining or connecting sections of an electrical busway.

In a preferred embodiment, the splice connector includes four horizontally and vertically spaced u-shaped busbar connectors with internal contact louvers, and two insulating housing sections, each accommodating two of the bus bar connectors. Horizontal spacing and isolation of the individual bus bar connectors in each of the housing sections is provided by an internal vertically-extending separating wall, while vertical isolation is provided by a separate planar spacer that is positioned between the housing sections.

2. Description of the Related Art

The rigorous demands of mission critical data center sites require methods to quickly disconnect and reconnect equipment without removing power from any other equipment. One way to meet these demands is to supply power via a modular "Continuous Bus Power Distribution System" (CBusPDS), which uses busways mounted overhead, on a wall, or under a raised floor to provide continuous power to equipment or equipment cabinets via plug-in power taps that can be inserted into the busways anywhere along their length. The overhead or wall mounted CBusPDS configuration allows users/installers to quickly insert or relocate plug-in power taps for added or replacement equipment, and to quickly remove the power taps for repair or replacement as necessary. An example of such a busway is the PDI PowerWave Bus System™ available from Smiths Power and described in U.S. Pat. No. 7,819,676. Other examples of busways with removable power taps include is Universal Electric Corporation's Starline® Track Busway, described in U.S. Pat. Nos. 6,521,837; 6,517,363; and 6,296,498, and the busways or tracks disclosed in U.S. Pat. Nos. 5,336,097; 5,449,056; 6,039,584; 6,105,741; 6,296,498; 6,521,837; 6,517,363; 6,805,226; 7,374,444; 7,468,488; and 7,470,861; and U.S. Patent Publication No. 2008/0302553.

In general, electrical distribution systems in the form of busways or tracks are made up of multiple straight, angled, and branching sections that can be connected together to fit different installation configurations. The electrical connectors that are used to join the sections are referred to as splices and generally include a set of connectors for electrically connecting together respective busbars in the busway sections to be joined. Examples of busway splices are disclosed in the above-cited U.S. Pat. No. 7,819,676, as well as which describes the POI PowerWave Bus System™, as well as U.S. Pat. Nos. 3,181,102; 3,189,679; 3,475,567; 5,609,254; 4,179,174; 5,760,339; and 5,854,445; 6,870,103; 6,983,742; and 7,678,995; and U.S. Patent Publication No. 2013/0171849.

In addition to connecting busbars in respective busbar sections, busbar connectors may be used in contexts that do not involve busway splices, such as the motor drive connection system of U.S. Patent Publication No. 2012/0264317, which pairs of u-shaped bus bar connectors housed in a single insulator housing, the bar connectors being mutually separated by an inner, vertically extending wall of the insulator housing. The arrangement of the present invention also utilizes an insulating housing with a vertically extending separator wall, but the insulting housing is arranged in upper and lower sections, and the splice includes a number of additional features not included in the arrangement of U.S. Patent Publication No. 2012/0264317, such as the use of multi-contact louvers in the individual busbar connectors and the inclusion of a vertical separator plate, which make the splice connector of the present invention especially suitable for use in modular power distribution systems such as the PDI PowerWave Bus System™.

SUMMARY OF THE INVENTION

An improved splice connector for sections of a power distribution busway includes upper and lower insulating housing sections arranged to support individual busbar connectors, each electrically connecting a respective busbar in each of the busway sections to be joined. The insulating housing sections are arranged to provide isolation between horizontally adjacent busbar connectors, while a separate plate is arranged to provide isolation between vertically adjacent busbar connectors in the respective upper and lower housing sections.

According to preferred embodiments of the invention, the splice connector utilizes individual connectors made of a conductive material and having a u-shaped cross-section that fit over ends of a pair of busbars to be aligned and electrically connected to each other, and within which are mounted multi-contact louvers that extend the length of the connectors to establish a low impedance electrical connection between the connector and the respective busbars. The louvers are secured in place by a dovetail groove that retains the louvers within the connectors and causes the individual contact sections of the louvers to bow outwardly so as to press against the busbars when the connector is fitted over the busbars. The connectors are snapped into insulative housing halves or sections that align the connectors with the busbars, and that provide isolation between horizontally aligned pairs of connectors. A planar insulator board provides separate between vertically-aligned pairs of busbars when the connectors are fitted over the busbars and the insulative housing sections are aligned and secured to each other to provide an easily assembled splice connection with a minimal number of parts and requiring a minimal number of assembly steps. A ground shunt in the form of a strap extends between and is secured to the busway sections. An optional ground shunt cover, data/communication cable cover, and shield housing may be added to complete the splice connector of the preferred embodiment.

As an optional added feature, the shims or spacers may be utilized to enable different sized u-shaped connectors to fit within a standard insulative housing section, thereby enabling the splice connector to be easily adapted to busway systems having different sizes of busbar.

Although not limited to a particular busway configuration, the splice connector of the invention is especially suitable for use in connection with power supply busway systems having multiple high current busbars, such as a CBusPDS busway system, which typically includes four bus bars arranged in upper and lower pairs. Those skilled in the art will, however, appreciate that the invention is not to be limited to high current power supply systems such as the four busbar arrangement, or to particular shape, dimensions, and configuration of the busbars or conductors to be connected. For example, the splice connector of the invention may be adapted to connect busway sections that supply single phase power, two pole power, two pole power with a neutral, or three phase power with or without neutral plus ground or DC power.

DETAILED DESCRIPTION OF THE PREFERRED EMBODIMENTS

Throughout the following description and drawings, like reference numbers/characters refer to like elements. It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention.

Figure 1:
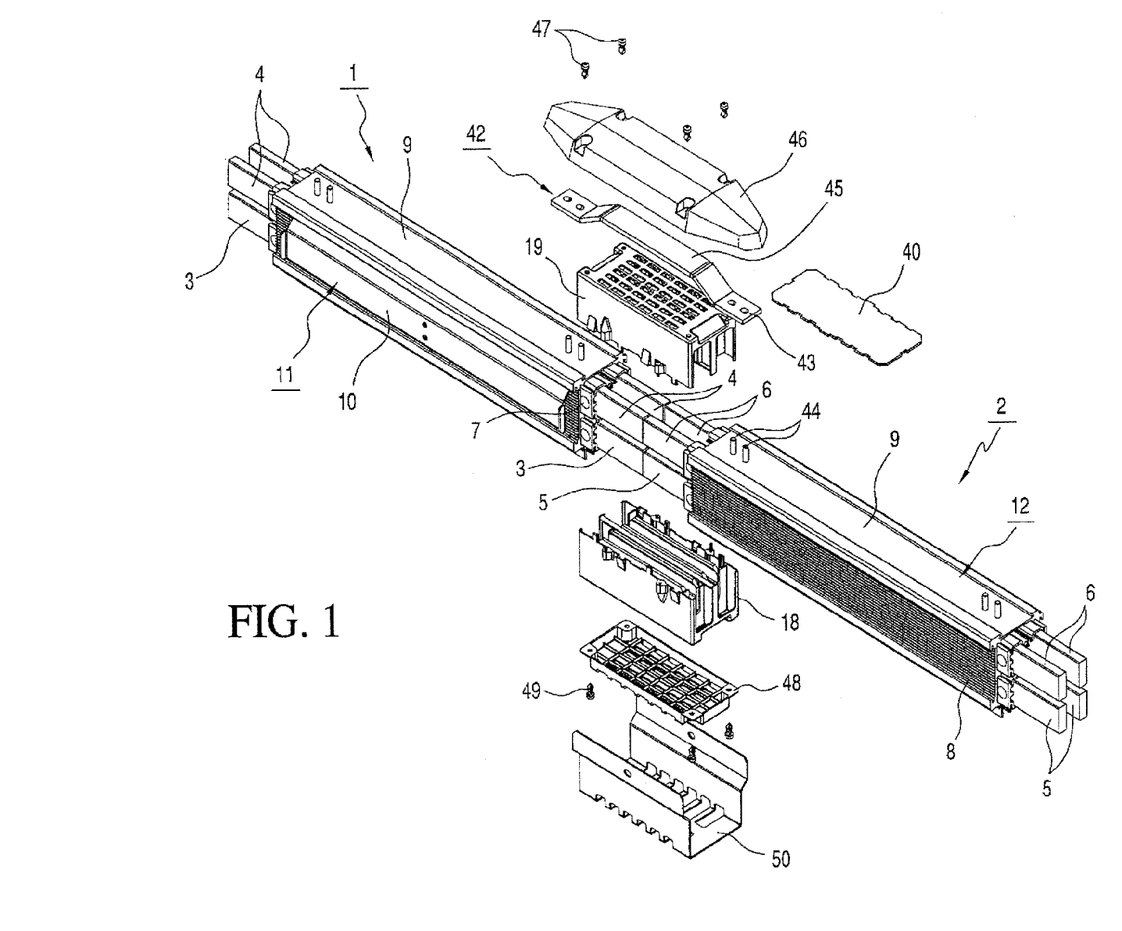
FIG. 1 is an isometric view illustrating components of the splice connector of a first preferred embodiment of the invention before assembly to a pair of busway sections.

FIG. 1 shows individual parts of a busway splice connection constructed in accordance with the principles of a first preferred embodiment of the invention, for coupling two exemplary busway sections 1 and 2. Busway section 1 includes a pair of lower busbars 3 and a pair of upper busbars 4, and busway section 2 includes a pair of lower busbars 5 and a pair of upper busbars 6, for supplying electricity to electrical equipment via plug-in power taps (not shown). The respective busway sections 1, 2 include housings 11, 12, brackets 7 for supporting the busbars 3-6, and/or various additional components (not shown) for receiving the power taps and enabling them to be electrically connected to the busbars 3-6. Illustrated features of the busway sections include grooved side panels 8 to facilitate heat dispersion, and metal top and side panels 9 and 10 that are either integral with the housings 11, 12 or mounted therein to provide electromagnetic shielding around the busbars 3-6.

As shown in FIG. 1, the busbars 3-6 in the respective sections 1, 2 are axially aligned so that ends 13 of the busbars face each other. The busway sections 1, 2 may correspond to those disclosed in U.S. Pat. No. 7,819,676, incorporated herein by reference. However, the invention is not limited to a particular busway system. In addition, within a particular busway system, the sections may have different shapes and dimensions, and may include both straight and curved sections or branched sections. While the busway sections illustrated in FIG. 1 are 1000A busway sections, the invention is in no way limited to a particular power rating or carrying capacity.

Electrical connection between the busbars 3-10 is provided by electrically conductive connectors 14-17 having a generally u-shaped cross-section. Each of the connectors 14-17 receives a respective busbar end that extends from the busway sections 1, 2. Two of the u-shaped connectors 14, 15 are in turn housed within a lower insulating housing section 18 and two of the u-shaped connectors 16, 17 are housed in an upper insulating housing section 19. Enlarged views of a pair of the u-shaped busbar connectors 14-17 and one of the insulating housing sections 18, 19 are included in FIGS. 2 and 3.

Figures 2, 3:
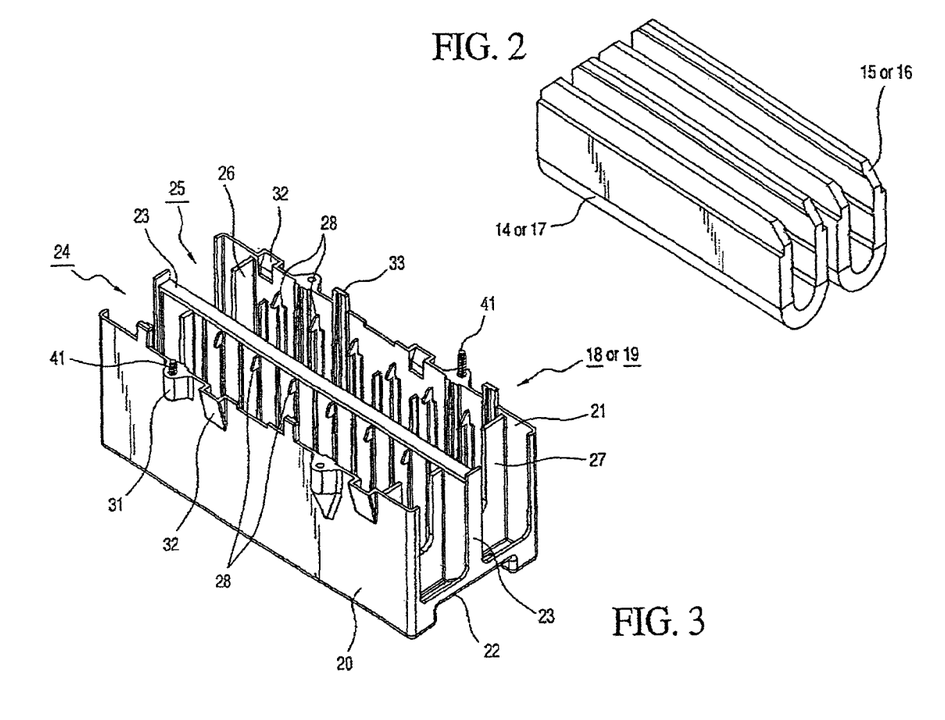
FIG. 2 is an isometric view of a pair of u-shaped connectors for use in the splice connector of FIG. 1.
FIG. 3 is an isometric view of an insulative housing section for use in the splice connector of FIG. 1.

As best shown in FIG. 2, the housing sections 18, 19 are preferably made of a high strength, high temperature plastic material and are arranged to both securely receive and support the busbar connectors 14-17, and also to electrically isolate pairs of busbar connectors 14, 15 and 16, 17 from each other. To accomplish this, the housing sections 18, 19 each includes two sidewalls 20,21 and a top/bottom wall 22 integral with and perpendicular to the sidewalls to form three sides of a structure having a rectangular or square cross-section. An isolating wall 23 extends transversely to the top/bottom wall 22 and parallel to the sidewalls 20,21 of the housing sections Isolating wall 23 separates the housing sections 18,19 into two longitudinally-extending compartments 24,25 for receiving the u-shaped connectors 14-17.

At each end of the longitudinally-extending compartments 24,25 is a respective u-shaped connector bulkhead 26,27 having a u-shaped cut-out that matches an exterior shape of the u-shaped connectors 14-17, and into which the u-shaped connectors are fitted. The u-shaped connectors 14-17 are further supported and held in place by hooks or detents 28 extending from each side of the respective compartments 24,25, i.e., from the interior surface of sidewalls 20,21 and facing surfaces of the isolating wall 23, such that a distance between inwardly-extending ends of the hooks is slightly less than width of the u-shaped connectors, to form a snap-fit arrangement. In order to assemble the u-shaped connectors 14-17 to the insulating housing sections 18,19, the u-shaped connectors 14-17 are inserted into corresponding compartments 24,25 of the respective housing sections 18, 19 by pushing them past the hooks or detents 28, causing the hooks or detents to flex sufficiently to permit passage of the connectors. When the u-shaped connectors 14-17 are fully inserted into the housing sections and the exterior surface of the housing sections are seated in the corresponding u-shaped cut-outs or slots of the bulkheads 26,27, the hooks or detents 28 clear the side walls of the connector and extend over the top edges 29,30 of the u-shaped connectors 14-17 to hold them in place. Optional vertically-extended ribs 34 extending from sidewalls 20,21 and/or isolating wall 23 may also be provided to further support and align the u-shaped connectors 14-17.

Additional features of the housing sections 18, 19 include exterior fastening structures or flanges 31 that may be provided at facing edges of the housing sections 18,19 for receiving fasteners to secure the housing sections to each other when placed over the busbars 3-6, and optional alignment structures such as slots 32 and pillars 33 arranged to extend into the alignment slots to facilitate alignment of the housing sections during assembly.

Figure 4:
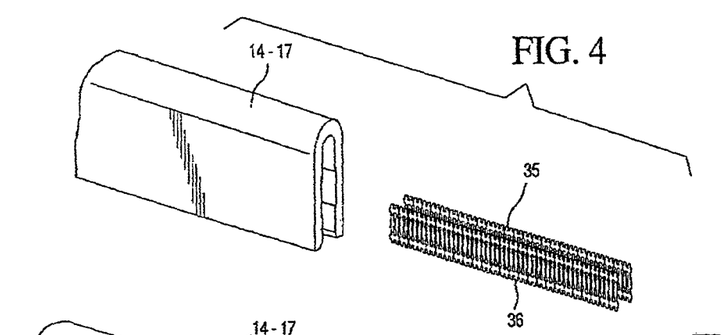
FIG. 4 is an isometric view of one of the u-shaped connectors FIG. 2 together with a pair of multi-contact louvers to be inserted into the u-shaped connector.
Figure 5:
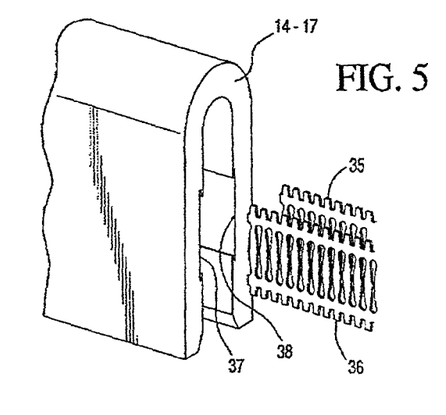
FIG. 5 is an enlarged view of the connector and louvers of FIG. 4.

As shown in FIGS. 4 and 5, u-shaped connectors 14-17 are arranged to include multi-contact slotted louvers 35,36. While the invention is not limited to a particular louver configuration or mounting arrangement, in the illustrated example, the u-shaped connectors 14-17 include dovetail grooves 37,38 into which the louvers 35,36 are fitted, such that when sides of the louvers 35,36 are positioned in the dovetail portions of the grooves 37,38, the louvers 35,36 are not only retained in place but also force to bow inwardly to securely engage the busbars 3-6 and thereby establish a good electrical connection between the busbars 3-6 and the connectors 14-17. The slots in the louvers 35,36 enable individual sections 39 of the louvers to conform to the exterior surfaces of the busbars 3-6 and thereby accommodate tolerances in busbar dimensions and position. Although FIGS. 4 and 5 only show one set of louvers 35,36 for each connector 14-17, it is within the scope of the invention to provide two or more sets of grooves 37,38 and louvers 35,36 in each of the connectors 14-17. An example of a part that may be used as a louver in the preferred splice connector is the "Contact SKT Solder ST Cable Mount Strip," Part No. 192004-8, by Tyco Electronics, although it will be appreciated that numerous other multiple contact strips may be substituted.

As illustrated in FIG. 1, after the u-shaped connectors 14-17 have been assembled to the respective upper and lower insulating housing sections 18, 19, the corresponding busbars 2-10 are inserted into the corresponding connectors 14-17 such that pairs of busbars are axially aligned and electrically connected by the connectors.

In additional to the vertical isolation provided by isolating walls 23 of the respective upper and lower housing sections 18, 19, horizontal isolation between upper and lower pairs of busbar connectors 14,15 and 16,17 in the respective housing sections 18, 19 of the preferred splice connector is provided by a planar insulator or plate 40 that fits between the upper and lower busbar connectors 14, 15 and 16, 17 to complete the electrical isolation between the respective busbars. The dimensions of the planar insulator 40 are sufficiently large to enable the planar insulator 40 to extend between all of the busbar connectors 14-17, but are less than the dimensions of the mating interface between the two housing sections 18, 19 so as to fit within the housing sections. To accommodate the planar insulator 40, the height of isolation wall 23 may be less than that of sidewalls 20,21 by an amount approximately equal to half the thickness of the planar insulator 40, thereby allowing the planar insulator 40 to be captured within the assembled housing formed by the two housing sections 18, 19.

To complete the illustrated splice, the housing sections 18, 19 are secured to each other by appropriate fasteners, such as threaded fasteners 41 extending through threaded through-holes in the vertically aligned exterior structures of flanges 31. Alternatively, latches, snap-fit arrangements, or other fastening means may be used to secure the housing sections 18, 19 to each other.

Figure 6:
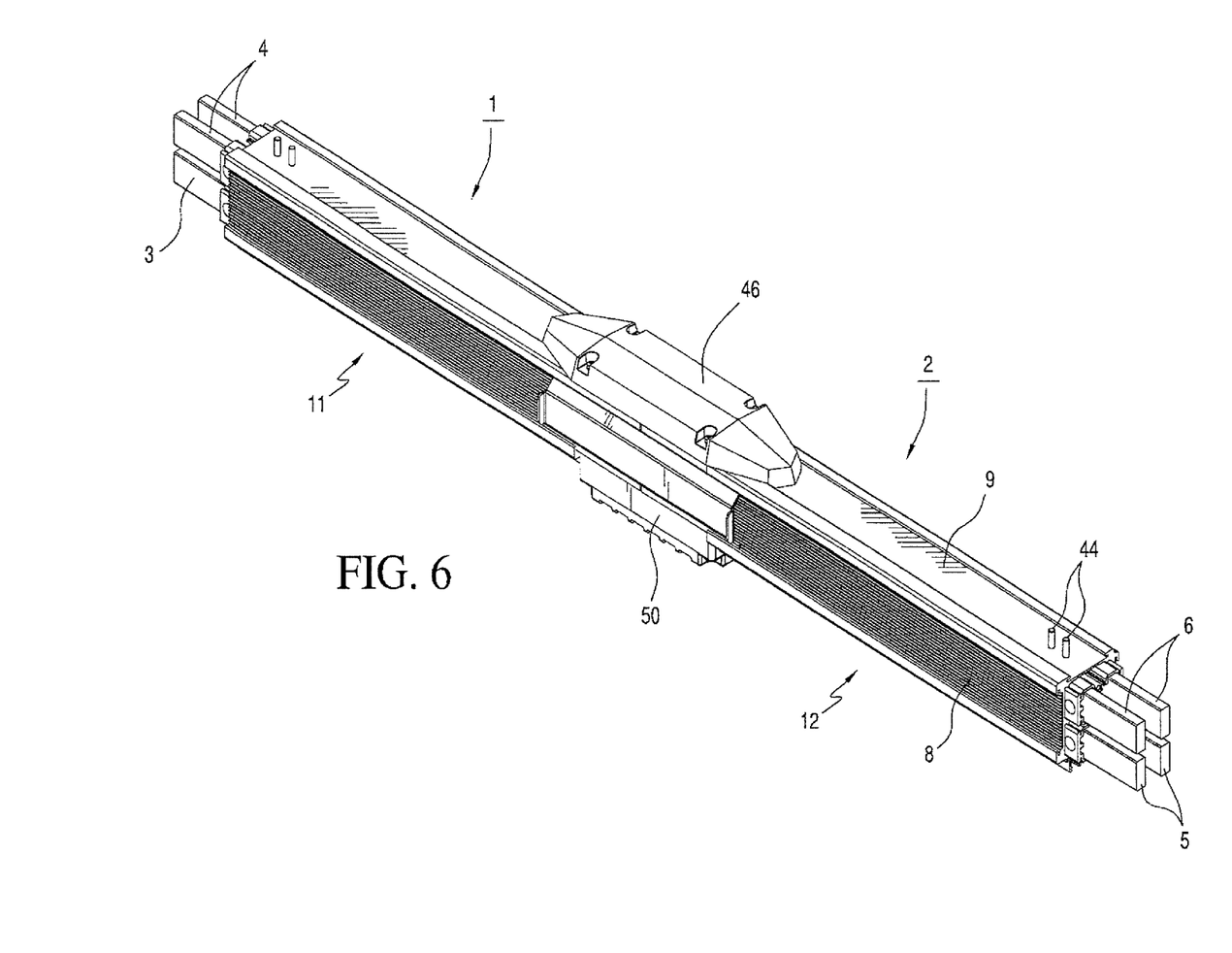
FIG. 6 is an isometric view showing an assembled splice connector.
Figure 7:
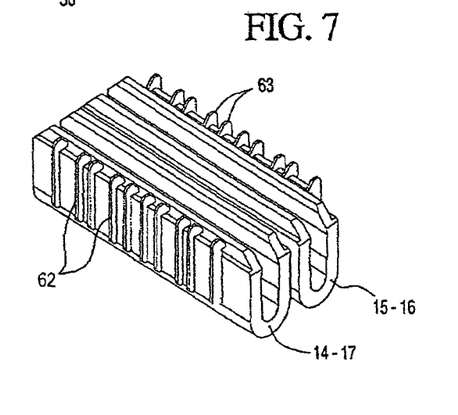
FIG. 7 is an isometric view of a pair of u-shaped connector and spacers for use in a second preferred embodiment of the invention.

After assembly of the housing sections 18,19 to the busbars 3-10, ends of a ground strap 42 may be fastened to respective metal top housing panels 9 of the busway sections 1,2 by, for example, fitting openings 43 in the ends of the ground shunt or strap 42 over threaded posts 44 extending from the respective metal top panels 9 and securing the ground shunt or strap 42 by appropriate washers and nuts (not shown) or other fasteners. As illustrated, the ground strap 42 is configured to include a raised bridge section 45 that extends over the splice, which may optionally be surrounded by a heat-shrink insulator sleeve (not shown). An insulating top cover 46 may further be installed over the splice and secured by fasteners 47 to cover the ground strap 42, and a lower cover 48 may be added to the opposite side of the splice and secured by fasteners 49 to cover and/or provide support for one or more data or communications cables that run along tracks or passages provided at the side or bottom of the busway. Finally, the entire may be enclosed by a shield housing 50. A fully assembled splice of FIG. 1, minus the shield housing 50, is illustrated in FIG. 6.

In a variation of the preferred embodiment of FIGS. 1-6, the splice may be adapted to accommodate different size busbars and busbar connectors. In particular, u-shaped connectors 60,61 may be modified to have smaller dimensions than the u-shaped connectors 14-17 shown in FIGS. 1 and 2, thereby accommodating busbars that are also smaller than those shown in FIG. 1. To enable the smaller u-shaped connectors 60,61 to fit within the housing sections 18, 19 of FIGS. 1 and 3 without having to provide different housing sections, spacers or shims 62,63 having exterior dimensions that match those of connectors 14-17 may be fitted over respective sides of the smaller u-shaped connectors 60,61.

What is claimed is:

1. A busway splice connector for connecting busbars together comprising:
    a U-shaped connector having a first dovetail groove, a second dovetail groove and two inner surfaces that define a volume therebetween for receiving portions of two busbars to be connected together, each dovetail groove having a groove height, the first dovetail groove being formed in a first inner surface of the two inner surfaces and the second dovetail groove being formed in a second inner surface of the two inner surfaces;
    a shim fitted over the U-shaped connector; and
    a conductive contact having a contact height that is greater than the groove height of the first dovetail groove which causes the conductive contact to bow towards a center of the volume between the two inner surfaces when the conductive contact is received by the first groove.

2. The busway splice connector of claim 1 further comprising a second conductive contact having a contact height that is greater than the groove height of the second dovetail groove which causes the second conductive contact to bow towards the center of the volume between the two inner surfaces when the second conductive contact is received by the second groove.

3. The busway splice connector of claim 1 wherein the conductive contact includes a plurality of louvers that each bow towards the center of the volume between the two inner surfaces when the conductive contact is received by the first dovetail groove.

4. The busway splice connector of claim 1 wherein the volume defined by the two inner surfaces is configured to receive a terminal end of each of the two busbars such that the two busbars are axially aligned.

5. The busway splice connector of claim 1 further comprising:
    a first housing defining a U-shaped slot having a similar size as the U-shaped connector and configured to receive the U-shaped connector;
    a second housing; and
    a fastener configured to be used to couple the first housing to the second housing such that the U-shaped connector is positioned within a volume defined by the first housing and the second housing when the first housing is coupled to the second housing.

6. The busway splice connector of claim 1 further comprising:
    a housing defining a U-shaped slot having a greater size than the U-shaped connector and configured to receive the U-shaped connector; and wherein the shim is configured to be coupled to the U-shaped connector such that when connected, the shim and the U-shaped connector fit within the U-shaped slot of the housing.

7. A busway splice connector for connecting busbars together comprising:
a conductive connector having a first dovetail groove, a second dovetail groove and two inner surfaces that define a volume therebetween for receiving an end of each of two busbars to be connected together in series, each dovetail groove having a groove height, the first dovetail groove being formed in a first inner surface of the two inner surfaces and the second dovetail groove being formed in a second inner surface of the two inner surfaces;
a plurality of shims fitted over the U-shaped connector; and
a conductive contact being flexible and having a contact height that is greater than the groove height of the first dovetail groove and configured to be received by the first dovetail groove such that the conductive contact bows towards a center of the volume between the two inner surfaces when the conductive contact is received by the first dovetail groove.

8. The busway splice connector of claim 7 further comprising a second conductive contact having a contact height that is greater than the groove height of the second dovetail groove which causes the second conductive contact to bow towards the center of the volume between the two inner surfaces when the second conductive contact is received by the second dovetail groove.

9. The busway splice connector of claim 7 wherein the conductive contact includes a plurality of louvers that each bow towards the center of the volume between the two inner surfaces when the conductive contact is received by the first dovetail groove.

10. The busway splice connector of claim 7 wherein the volume defined by the two inner surfaces is configured to receive a terminal end of each of the two busbars such that the two busbars are axially aligned.

11. The busway splice connector of claim 7 further comprising:
a lower housing defining a slot having a similar shape and a similar size as the conductive connector and configured to receive the conductive connector;
an upper housing; and
a fastener configured to be used to couple the upper housing to the lower housing such that the conductive connector is positioned within a cavity defined by the upper housing and the lower housing when the upper housing is coupled to the lower housing.

12. The busway splice connector of claim 7 further comprising:
a housing defining a slot having a similar shape as the conductive connector and a larger size than the conductive connector and configured to receive the conductive connector; and
wherein a respective shim of the plurality of shims is configured to be coupled to the conductive connector such that when coupled, the respective shim and the conductive connector fit snugly within the slot of the housing.

13. A busway splice connector for connecting busbars comprising:
a first conductive connector, a second conductive connector, a third conductive connector and a fourth conductive connector each having two inner surfaces that define an area therebetween for receiving a portion of two busbars;
a first housing defining a first slot having a similar shape and size as the first conductive connector and configured to receive the first conductive connector and a second slot having a similar shape and size as the second conductive connector and configured to receive the second conductive connector, the first conductive connector and the second conductive connector being insulated from each other when received by the first slot and the second slot;
a second housing configured to mate with the first housing and defining a third slot having a similar shape and size as the third conductive connector and configured to receive the third conductive connector and a fourth slot having a similar shape and size as the fourth conductive connector and configured to receive the fourth conductive connector, the third conductive connector and the fourth conductive connector being insulated from each other when received by the third slot and the fourth slot; and
an insulator configured to insulate the first conductive connector and the second conductive connector from the third conductive connector and the fourth conductive connector such that each of the first conductive connector, the second conductive connector, the third conductive connector and the fourth conductive connector are insulated from each other when the second housing is mated with the first housing.

14. The busway splice connector of claim 13 wherein the first housing includes detents or tabs extending into the first slot for resisting separation of the first conductive connector from the first housing and detents or tabs extending into the second slot and the second conductive connector for resisting separation of the second conductive connector from the first housing.

15. The busway splice connector of claim 13 further comprising four contacts each configured to be coupled to a groove of one of the two inner surfaces of each of the first conductive connector, the second conductive connector, the third conductive connector and the fourth conductive connector, each of the four contacts being compressible and configured to electrically connect the corresponding conductive connector and the two busbars.

16. The busway splice connector of claim 15 wherein the groove of the one of the two inner surfaces of each of the first conductive connector, the second conductive connector, the third conductive connector and the fourth conductive connector has a groove height and wherein each of the four contacts each has a contact height that is greater than the corresponding groove height such that each of the four contacts bows towards a center of the area between the two corresponding inner surfaces when received by the corresponding groove.

17. The busway splice connector of claim 16 wherein each of the grooves has a dovetail shape and each of the four contacts includes a plurality of louvers that each bow towards the center of the area between the two corresponding inner surfaces.

18. The busway splice connector of claim 13 further comprising a fastener configured to be used to couple the first housing to the second housing.

19. The busway splice connector of claim 13 further comprising a shim configured to be coupled to the first conductive connector and wherein the first slot is larger than the first conductive connector such that when coupled, the first conductive connector and the shim fit snugly in the corresponding slot.

20. The busway splice connector of claim 13 further comprising a first cover configured to be coupled to at least one of the first housing or the second housing and to provide physical support for at least one cable or wire.

* * * * *